Jan. 24, 1956 R. E. RISLEY ET AL 2,732,230
RECESSED JOINT FOR CONCRETE PIPE
Filed Oct. 31, 1951 5 Sheets-Sheet 1

INVENTORS
ROGER E. RISLEY AND
GEORGE D. KISH
BY
Robert E Burns
ATTORNEY.

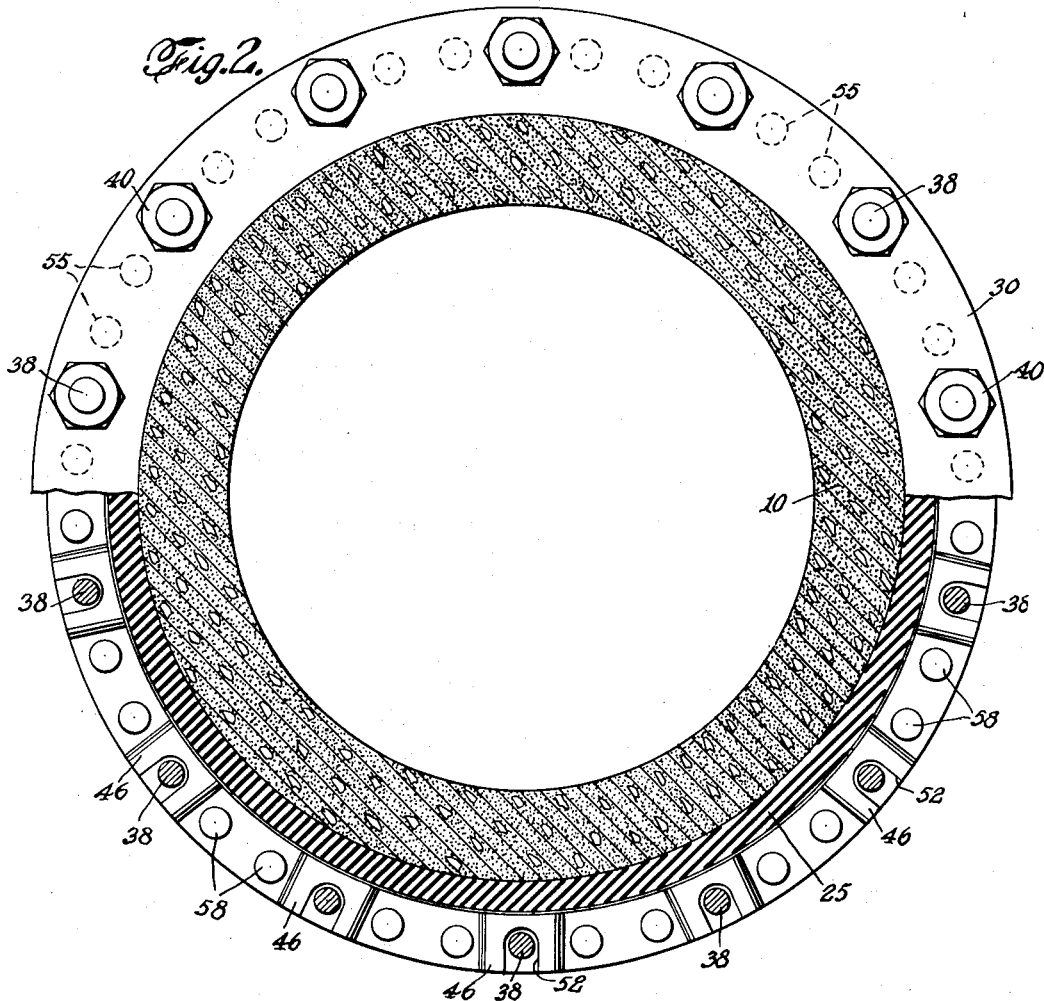
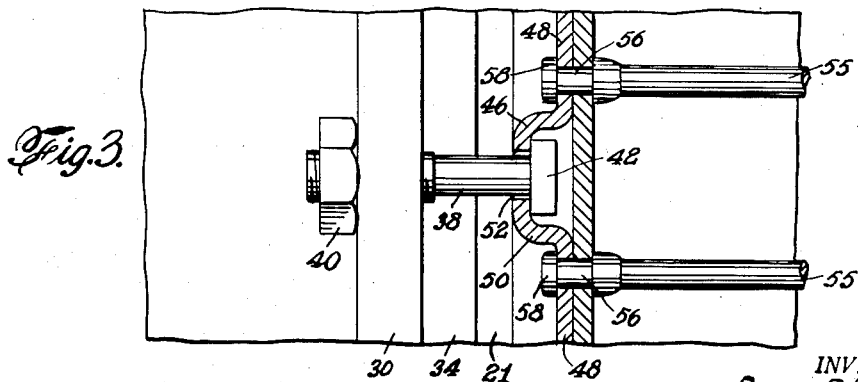

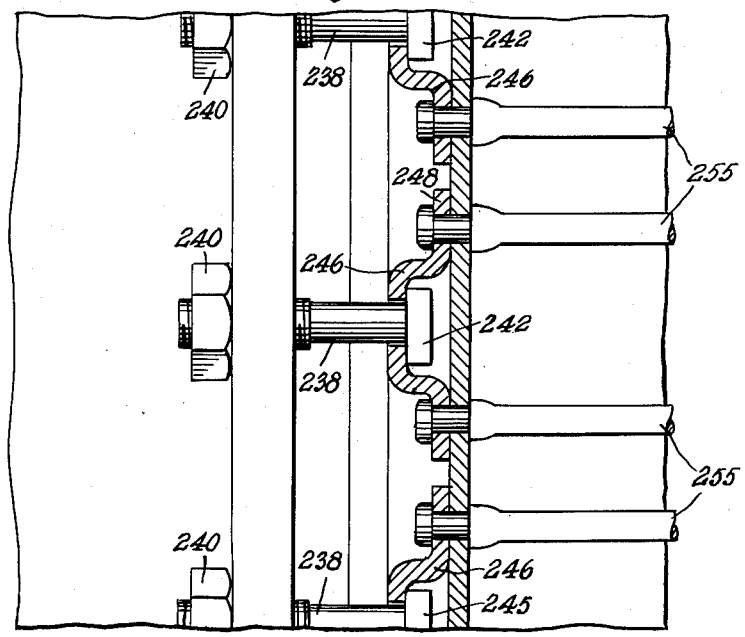
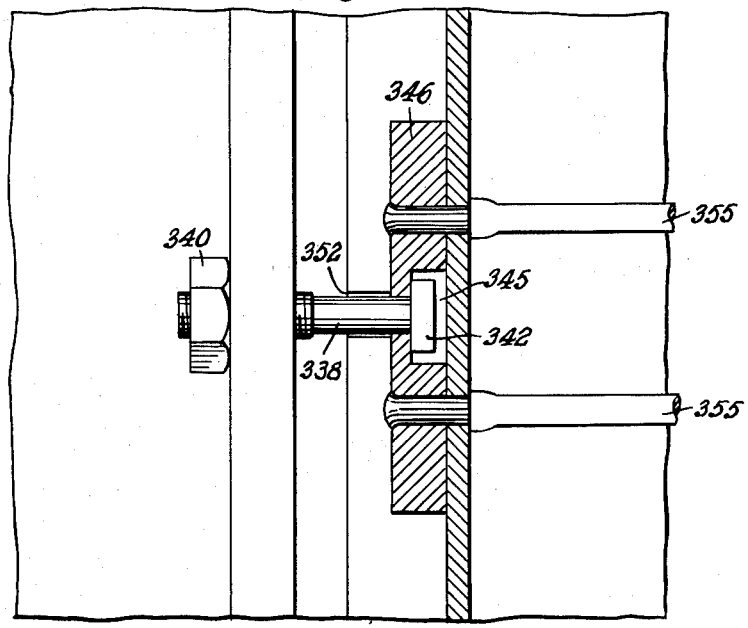

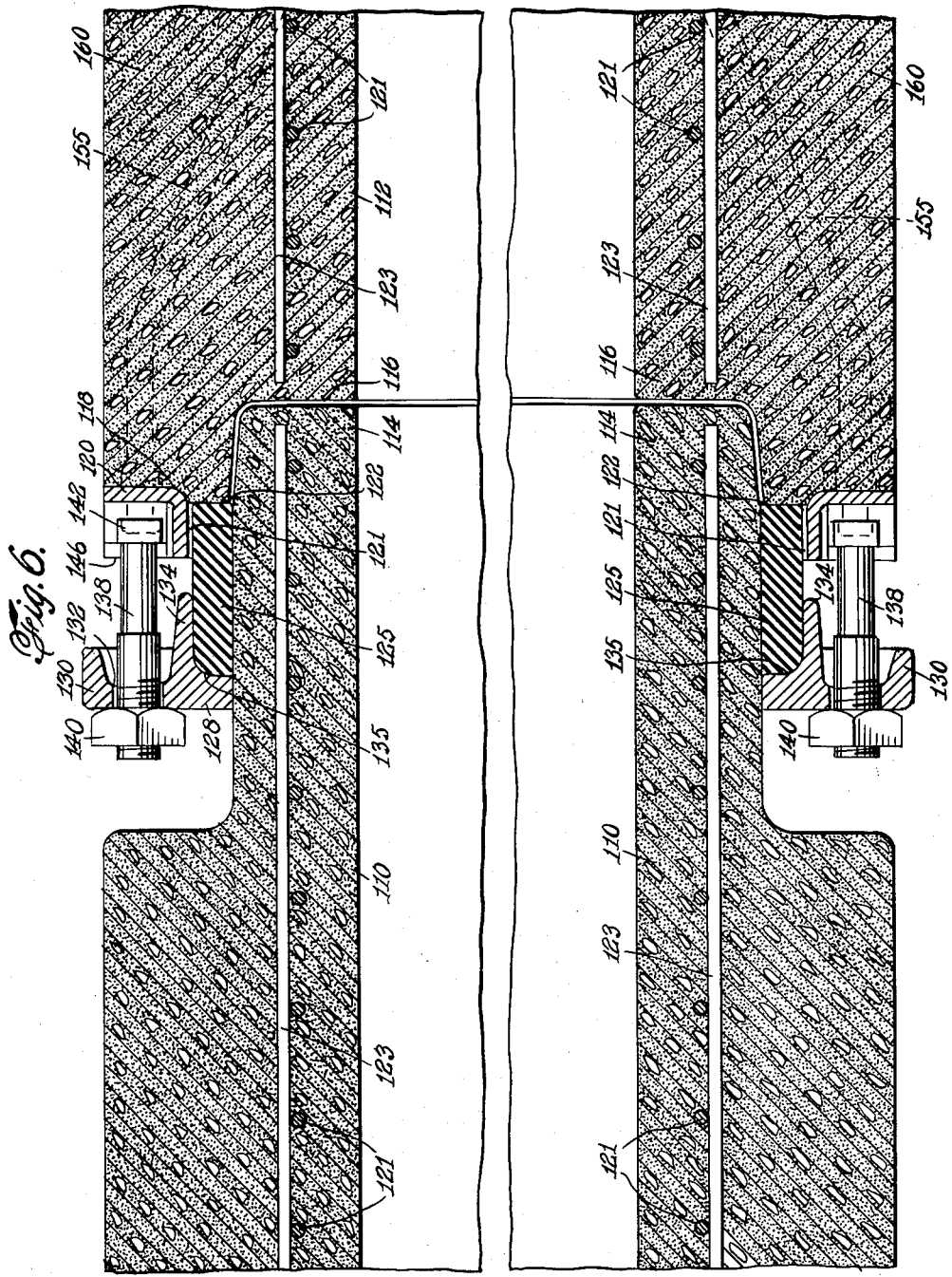

Jan. 24, 1956    R. E. RISLEY ET AL    2,732,230
RECESSED JOINT FOR CONCRETE PIPE

Filed Oct. 31, 1951    5 Sheets-Sheet 5

INVENTORS
ROGER E. RISLEY AND
BY  GEORGE D. KISH

ATTORNEY.

United States Patent Office 2,732,230
Patented Jan. 24, 1956

2,732,230

RECESSED JOINT FOR CONCRETE PIPE

Roger E. Risley and George D. Kish, Bradford, Pa., assignors to Dresser Industries, Inc., Dallas, Tex., a corporation of Pennsylvania Application October 31, 1951, Serial No. 254,073

1 Claim. (Cl. 285—135)

This invention relates to concrete pipe and is more particularly concerned with joint structures for concrete pipe whereby an effective, fluid-tight sealing of the joint between the abutting concrete pipe sections may be readily obtained.

In the past, concrete pipe joints constructed in accordance with conventional practice have been excessively inefficient and fluid-tightness has been exceedingly difficult to obtain. This fact has been accepted in the art and has indeed been recognized in the usual specifications for concrete pipe, which allow a relatively high rate of leakage when the pipe is in service. Obviously, this inefficiency of concrete pipe has greatly limited the suitability of such pipe for many uurposes. If a fluid-tight joint could be provided, however, concrete pipe would have both economical and practical advantages which would make it highly desirable for many uses for which it is not now suited, particularly where a pipe of relatively long diameter is necessary, e. g. diameters of 2 feet and up. There have been, therefore, various proposals directed to joint structure for concrete pipe which are concerned with the problem of providing an efficient leakproof joint in concrete pipe lines which is comparable in its effectiveness to those obtainable with steel pipe. While many of these prior proposals are to some extent satisfactory in that the fluid-tightness of the joint between adjacent concrete pipe sections is increased, they generally suffer from various disadvantages which limit their utility in various respects. Many of the previously proposed joint structures are, for example, expensive to manufacture and install and require complex fabrication procedures which add greatly to the cost of the pipe. Some of the prior structures also make necessary the use of relatively skilled labor for their proper installation. In other cases the joint structures heretofore proposed involve sealing arrangements which are accessible only from inside the pipe, an obvious disadvantage in many cases, and a construction which makes maintenance particularly difficult. In still other cases the prior proposals have involved structures that are relatively rigid and permit little or no deflection of the pipe in service and, as a result, deflection forces which are normally encountered in concrete pipe installations frequently cause cracking and even more serious damage to the pipe. It is obvious, therefore, that for the most part, the prior proposals for providing fluid-tight sealing structures for concrete pipe joint leave considerable room for improvement. In our copending application, Serial No. 223,212, filed April 27, 1951, there is disclosed a concrete pipe joint structure which represents a significant improvement over prior structures.

It is the principal object of the present invention to provide another improved pipe joint arrangement which avoids the above enumerated disadvantages and shortcomings of constructions heretofore proposed.

It is a further object of the invention to provide a joint structure of the character indicated which is relatively simple in construction and inexpensive to manufacture, and which may be effectively and satisfactorily installed even by unskilled labor.

It is another object of the invention to provide a leakproof joint for concrete pipes which is comparable in its effectiveness to joints generally provided in steel pipe lines.

It is a further object of the invention to provide a concrete pipe line having fluid-tight flexible joints which permit normal deflection of the pipe line while maintaining the effectiveness of the joint seal and preventing cracking and other damage to the pipe.

It is another object of the invention to provide a concrete pipe line having fluid-tight flexible joints which are accessible for installation and maintenance from the exterior of the line.

In accordance with the invention, there are provided concrete pipe sections having substantially colinear external surfaces but having complemetary end portions, viz. a recessed portion which receives a projecting portion of the adjacent pipe section, the seal between the adjacent pipe sections being provided by a resilient gasket, a follower ring member which urges the gasket into fluid-tight sealing relationship between the adjoining pipe sections, bolt means for drawing the follower ring toward the recessed pipe end to compress the gasket, and means secured in the recessed pipe section for releasably holding one end of the bolts. In accordance with the invention, the bolt holding means comprise a plurality of bolt-holding sockets secured to a ring member extending circumferentially around the recessed pipe section and anchored thereto.

It is a feature of the joint construction of the invention that the joint between the adjacent pipe sections may be sealed and fluid-tightness effected exteriorly of the pipe without necessitating access to the interior of the pipe.

It is another feature of the joint construction of the invention that the bolt-holding sockets which are circumferentially disposed around the recessed end of the concrete pipe section permit the bolts to be removably secured and permit the follower ring member to be tightened to compress the gasket to the desired extent without damage to the pipe sections.

It is a further feature of the invention that the bolt-holding structure includes portions which provide an integral recess for receiving the forward end of the gasket.

It is another feature of the invention that the follower ring member provides a gasket recess which cooperates with the recess integral in the pipe section to provide a double enclosure for the gasket.

It is a further feature of the invention that the bolt-holding structure is such that relative deflection of the pipe sections is permitted without adversely affecting the fluid-tightness of the seal effected by the compressed gasket between the adjoining inter-fitting portions of the pipe sections.

Other objects and features of the invention will be readily apparent from the following detailed description of illustrative embodiments thereof and from the drawings. wherein, Fig. 1 is a longitudinal sectional view of a portion of a concrete pipe line showing a joint construction between the adjacent pipe sections embodying features of the present invention;

Fig. 2 is a transverse sectional view taken approximately along the line 2—2 of Fig. 1;

Fig. 3 is a fragmentary plan view of the structure shown in Fig. 1 showing details of the construction of the bolt sockets;

Fig. 4 is a fragmentary plan view similar to Fig. 3 but showing a modified form of bolt socket construction;

Fig. 5 is another fragmentary plan view similar to Fig.

Figure 1:
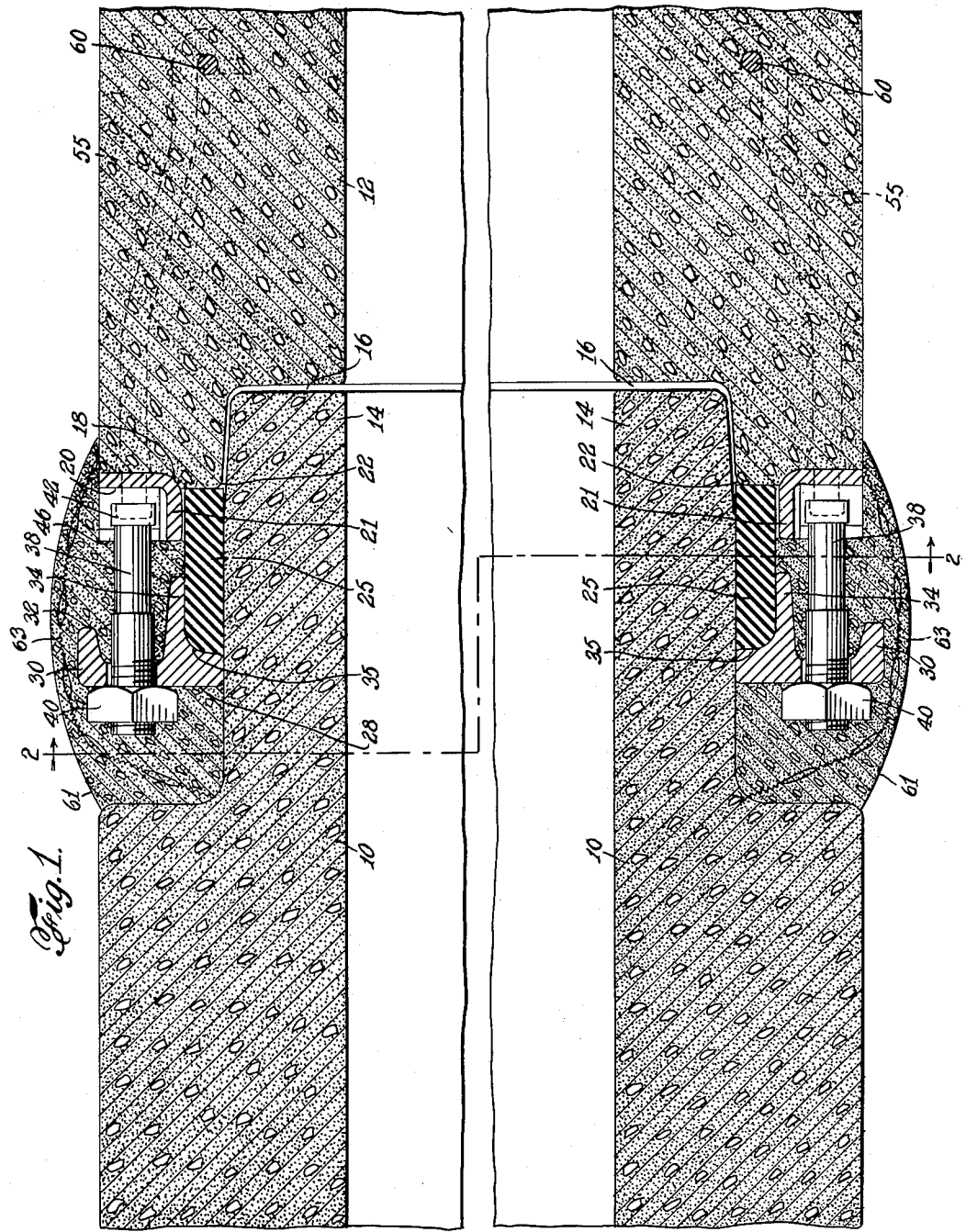
Figure 7:
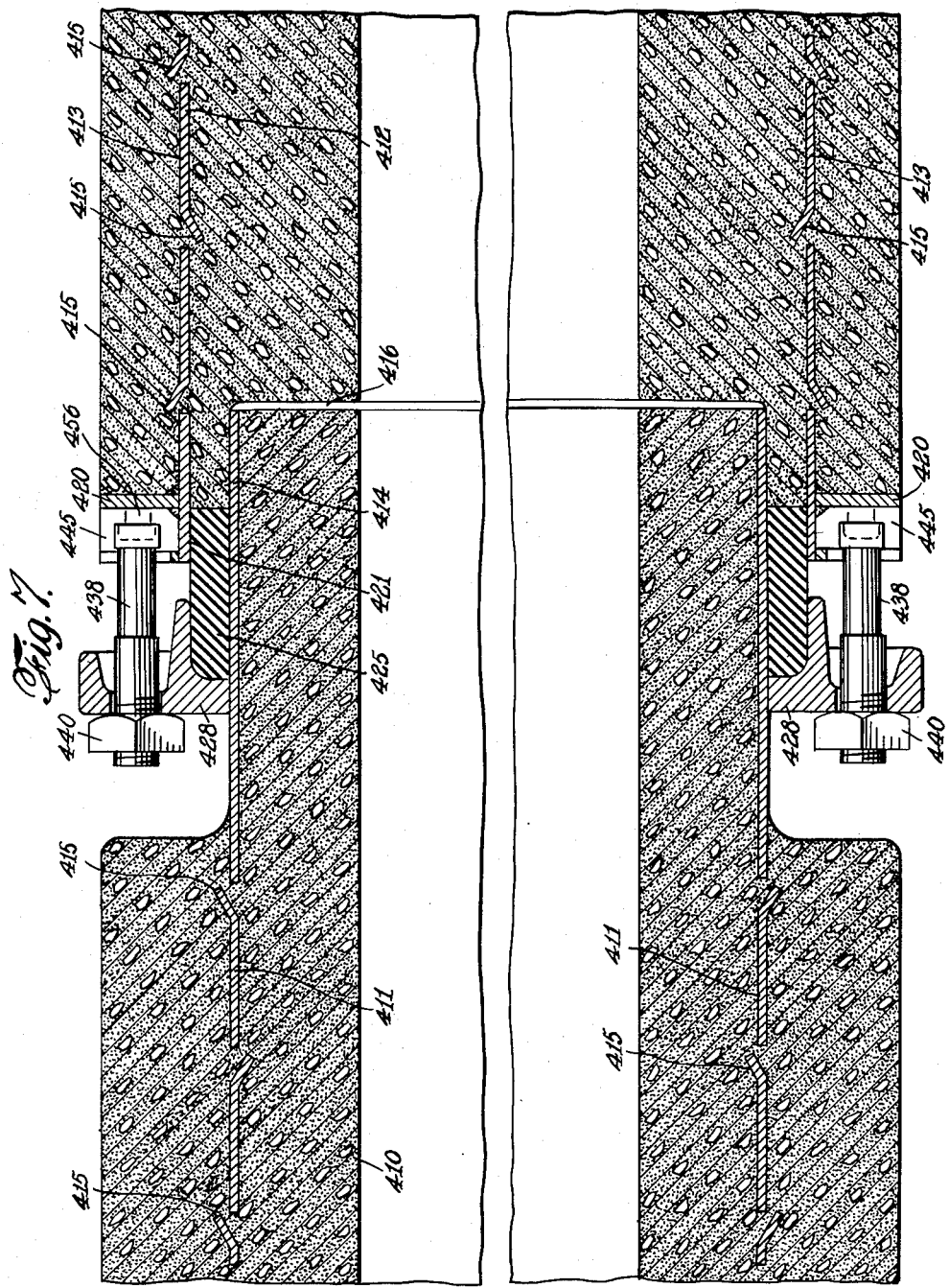

3 but showing another modified form of bolt socket construction;

Fig. 6 is a longitudinal sectional view of a modified form of the pipe line structure shown in Fig. 1 illustrating the use of reinforcing means in the adjacent pipe sections; and Fig. 7 is a longitudinal sectional view of a portion of a concrete pipe line showing another embodiment of the joint structure in accordance with the present invention.

Referring to the drawings, and more particularly to Figs. 1, 2 and 3, there are shown the ends of two abutting sections 10 and 12 of a concrete pipe line constructed in accordance with the invention, the pipe section 10 having a projecting portion 14 and the pipe section 12 having a complementary recessed portion 16 adapted to receive the projecting portion 14 when the pipe section 10 and 12 are interconnected. The pipe sections 10 and 12 are formed from concrete in the usual manner.

The end of pipe section 12 is provided with a ring 18 having a radially-extending body portion 20 and an outwardly extending axial portion 21 which extends beyond the end of pipe section 12 and defines an annular gasket recess 22.

Seated around the projecting portion 14 of pipe section 10 and adapted to be compressed in the gasket recess 22 is a resilient gasket member 25. The gasket 25 is in the form of an annular sleeve and is formed from rubber or rubber composition, this term being used generically to include natural and synthetic rubbers and elastomeric compounds, or compositions having like properties and characteristics. The material forming the gasket 25 is relatively firm and solid but sufficiently resilient and elastic to flow under pressure to conform to the surfaces between which it is confined. While the gasket member 25 may be in the form of a continuous sleeve, it is also advantageously split at one point and provided with overlapping or abutting ends.

When the pipe sections are assembled, the gasket 25 is compressed into sealing engagement with the adjacent portions of pipe sections 10 and 12 by means of a follower ring 28 having a radial body portion 30 provided with a plurality of circumferentially spaced bolt apertures 32, and an axial web portion 34 spaced outwardly from the inner edge of the body portion 30. The web 34 cooperates with the inner end of the body portion 30 to define a gasket recess 35. Thus, the gasket member 25 is confined at both its ends in the gasket recesses 22 and 25. When the follower ring 28 is moved toward the gasket recess 22, the gasket 25 is compressed axially and expanded radially inwardly into sealing relationship with the surface of projecting portion 14 and the end surface of pipe section 12 adjacent gasket recess 22. While the follower 28 may be in the form of a unitary ring, it is advantageously formed from two semi-circular segments having abutting end portions or overlapping end portions of reduced thickness.

Gasket compressing pressure is applied to the follower 28 by means of bolts 38 which pass through the circumferentially spaced bolt apertures 32 in follower body 30 and are engaged by nuts 40. In accordance with the invention, the heads 42 of the bolts 38 are held in sockets which are secured to pipe section 12, whereby tightening of the nut 40 upon the bolts 38 will move the follower 28 toward pipe section 12 to compress the gasket. As shown in Figs. 1, 2 and 3, bolt head sockets 45 are defined by socket members 46 having flange portions 48 overlying the outer surface of the body portion 20 of ring 18 and having an outwardly-extending bulged body portion 50 provided with a radially-extending aperture or slot 52 for receiving the head 42 of the bolt 38. As will be seen in Fig. 3, the bolt heads 42 are rectangular in outline so that they will pass through the slot 52 but will engage the forward wall of the body portion 50 of the sockets 45 when given a quarter turn, and will thus be effectively held against withdrawal. In the embodiment shown in Figs. 1, 2 and 3, the flanges 48 of successive socket members 46 are interconnected to define a continuous structure from one bolt slot 52 to the next. The ring 18 and the socket members 46 are secured to the pipe section 12 by means of anchor rods 55 which have shank portions 56 which extend through the body portion 20 of the ring 18 and the flanges 48 and have head portions 58 to prevent withdrawal. The anchor rods 56 advantageously are inclined inwardly toward the axis of the pipe so that they become embedded more firmly in the concrete body of the pipe section 12, and in order to insure against radial displacement the inner ends of the anchor rods 55 are conveniently secured to annular reinforcing rings 60 or other convenient means.

When the nuts 40 are tightened upon the bolts 38, the follower 28 is moved axially toward pipe section 12 to compress gasket 25 axially and thereby to expand it radially into sealing engagement with the adjoining surfaces of the pipe sections 10 and 12. The anchorage of the bolt heads 42 in the sockets 45 insures a uniform axially-directed force upon the follower and an effective yet flexible seal is obtained. The cooperative action of the gasket recesses defined by the flange 22 of the ring 18 and by the web 34 of follower 28 insures efficient compression of the gasket.

It will be apparent that the pipe sections may thus be joined quickly and easily and that no preliminary preparation of the pipes is necessary. Thus, the projecting portion 14 is moved axially into place in the complementary recessed portion 16 of pipe section 12 as shown in Fig. 1. The gasket 25 which, as mentioned, is conveniently in the form of a split sleeve is then placed around the projecting portion 14 and pushed into place in the gasket recess 22 defined by the flange 21. The follower 28 is then placed in position around the projecting portion 14 with its web 34 overlying the gasket 25. If the gasket 25 and the follower 28 are in the form of continuous rings then it will be apparent that they must be positioned on the projecting portion 14 of pipe section 10 before this pipe section is moved into place in recess 16. The bolts 38 are placed in position in the sockets 45 and in the bolt apertures 32 in the follower and the nuts 40 tightened to draw the follower toward the pipe section 12 to compress gasket 25. The desired fluid-tight joint is thus effected rapidly and easily from the exterior of the pipe line and a fluid-tight yet relatively flexible connection between the pipe sections is obtained. After the tightening of the nuts 40 is completed, the recessed portion of the pipe line in which the follower 28 is seated may be filled with cement or the like to provide the line with a substantially continuously outer surface.

It will be apparent from the foregoing that the concrete pipe joint assembly of the invention is applicable to concrete pipe of various diameters and constructions. For example, as shown in Fig. 6, pipe sections may be formed with reinforcing rods embedded in the concrete structure of the pipe to give the pipes increased strength. Thus, in the pipe sections 110 and 112, shown in Fig. 6, circumferentially reinforcing rods 121 are interconnected with axial reinforcing rods 123. The ends of anchoring rods 155 are welded or otherwise suitably connected to the reinforcing rods. The invention is not limited, therefore, to concrete pipes having body portions constructed in any particular manner nor to concrete pipes of any particular diameter.

It will also be apparent that the structure of the invention may be embodied in pipe joint constructions differing in some respects from the embodiment above described, and illustrated in Figs. 1, 2 and 3. Thus, referring to Figs. 4 and 5, wherein parts corresponding to those shown in Figs. 1, 2 and 3 are given like reference numerals to which 200 and 300, respectively, have been added, there are shown fragmentary views of concrete pipe joints embodying features of the present invention but having bolt sockets of somewhat modified structure.

As shown in Fig. 4, the bolt socket members 246 have flange portions 248 which are non-integral with the flange portions of the adjoining bolt sockets 245. Each of the sockets 245 is, therefore, independent of the adjoining sockets and thereby differs from the sockets 45 shown in Fig. 1 which form a continuous structure.

As shown in Fig. 5, the bolt sockets 345 are defined by blocks 346 secured in position by means of anchor rods 355. The block 346 illustrated has a cut-out portion 347 in which the head 342 of bolt 338 is received and a radial slot 352 through which the head 342 may be inserted.

In the foregoing embodiments, while reference has been made to inserting the heads of the bolts through the slots in the bolt head sockets and then giving the bolt heads a quarter turn, it will be apparent that since the sockets are advantageously open at their radial outer ends, the bolt shanks may be slipped into the slots without passing the heads through the slots. If desired, bolts may be used which have heads which are too large to pass through the slot in the forward wall of the sockets and such bolts must be inserted into the sockets radially.

In Fig. 7, wherein parts corresponding to those shown in Figs. 1, 2 and 3 are given like reference numbers to which 400 has been added, there is shown another concrete pipe joint embodying features of the present invention but having a somewhat modified structure. As shown in Fig. 7, pipe section 410 has a projecting portion 414 which is received in the recess 416 of adjacent pipe section 412. The pipe section 410 is provided with a metal shell 411 extending from the free end of projecting portion 414 inwardly into the body of the pipe section and provides the gasket engaging peripheral surface of the projecting portion 414. A lining of concrete is provided interiorly of shell 411 and the inner end of this shell is embedded in the main body portion of the pipe. In like manner, pipe section 412 is provided with a shell 413 which extends outwardly upon the concrete portion of the pipe at its free end to form a circular projecting portion 421 defining a gasket recess 428. Secured, as by welding, to the shell 413 and spaced inwardly from the outer end of this shell, is a radially extending ring 420. Secured to the ring 420 in circumferentially spaced relationship are sockets 445, the sockets 445 being secured by rivets 456 or by other convenient means. The sockets are advantageously of the continuous ring type shown in Fig. 3. The shell 413 provides anchorage for the ring 420 and it is generally, therefore, not necessary to provide anchoring rods, e. g. the rods 55 shown in Fig. 1, for the sockets, although such rods may be provided if desired. It will thus be seen that the cooperative action of the ring 420 with the outer end of the shell 413 provides the structure defined by ring 18 of Fig. 1, and defines a similar gasket recess which cooperates with the gasket recess in the follower 428 to form an enclosure for the gasket 425 to insure effective uniform compression of this member into sealing engagement with the adjoining pipe sections.

The metal shells 411, 413 are advantageously perforated or provided with protuberances, punched projections 415 or the like to increase their anchorage in the concrete.

While the shells have been shown in only the end portions of the pipe sections, they may extend the full length of the pipe or may be welded or otherwise attached to a shell extending substantially the full length of the pipe, or to reinforcing members such as rods embedded in the concrete.

Exposed metal parts such as the follower ring and bolts are preferably coated with corrosion resistant material, e. g. a coal tar base or asphaltic base coating. Instead of or in addition to such coating, the annular space in which these parts are disposed may be filled with Portland cement, asphaltic or other grout as indicated at 61 in Fig. 1. The grout is held in place by the bolts and associated parts and by a strip of woven wire 63 wrapped around the joint.

In the embodiments illustrated, it will be apparent that various features are interchangeable. Thus, for instance, if desired, particularly in large diameter pipes reinforcing rods of the type shown in Fig. 6 may be incorporated in the structure of the embodiment of Fig. 7. Similarly, the socket structures shown in Figs. 1, 4 and 5 may be employed in the joint structure shown in Fig. 7. It will also be apparent that various other changes and modifications may be made in the embodiments illustrated and described above without departing from the scope of the invention as defined in the appended claim and it is intended, therefore, that all matter contained in the foregoing description and in the accompanying drawings shall be interpreted as illustrative only and not in a limiting sense.

What we claim and desire to secure by Letters Patent is:

In a concrete pipe line, end abutting sections of concrete pipe, one of said sections having a bell end defining an annular recess adjacent the axial opening through said section and the other of said sections having a projecting portion received in said recess, a ring positioned at the end of said first-named pipe section adjacent the outer periphery thereof, an axially-extending sleeve adjoining said ring and extending outwardly from the end of said first-named pipe section to define an annular gasket recess adajcent but apart from said first-named recess and spaced radially outwardly therefrom, a plurality of integral bolthead sockets defined by a continuous ring of uniform thickness having a plurality of circumferentially spaced axially offset portions and secured to said first-named ring, anchor means for securing said first ring to said first-named pipe section, compressible gasket means on said projecting portion engageable in said gasket recess provided in the bell end of said first-named pipe section adjacent said first-named recess, follower means exteriorly of said pipe sections for compressing said gasket means in said gasket recess, and bolt means loosely engageable with said follower means for urging said follower means toward said first-named pipe section, said bolt means having head portions engageable in said sockets and being actuatable to compress said gasket wholly from the exterior of said pipe sections, said socket members being provided with bolt receiving slots extending radially inwardly from the exterior of said continuous ring adapted to permit insertion of the bolt heads into said sockets entirely from the exterior of the pipe sections after embedment of the socket members in said sections.

References Cited in the file of this patent
UNITED STATES PATENTS

| | | |
|---|---|---|
| 364,947 | Moore | June 14, 1887 |
| 1,310,740 | Coffey | July 22, 1919 |
| 1,401,105 | Meriwether | Dec. 20, 1921 |
| 2,162,431 | Helms | June 13, 1939 |